United States Patent
Otanez et al.

(10) Patent No.: US 8,771,121 B2
(45) Date of Patent: Jul. 8, 2014

(54) LATCHING CLUTCH VALVE CONTROL SYSTEM

(71) Applicant: GM Global Technology Operations LLC, Detroit, MI (US)

(72) Inventors: Paul G. Otanez, Troy, MI (US); Craig S. Ross, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/918,117

(22) Filed: Jun. 14, 2013

(65) Prior Publication Data
US 2013/0341152 A1 Dec. 26, 2013

Related U.S. Application Data

(60) Provisional application No. 61/663,804, filed on Jun. 25, 2012.

(51) Int. Cl.
*F16H 31/00* (2006.01)

(52) U.S. Cl.
USPC ........... 475/127; 475/116; 475/142; 475/146; 251/32

(58) Field of Classification Search
USPC ...................... 475/116, 127, 142, 146; 251/32
See application file for complete search history.

(56) References Cited

U.S. PATENT DOCUMENTS

| | | | | |
|---|---|---|---|---|
| 2,966,918 | A * | 1/1961 | Kosmalski | 251/116 |
| 4,446,759 | A * | 5/1984 | McCrary | 475/146 |
| 8,561,640 | B2 * | 10/2013 | McConnell et al. | 251/230 |
| 2011/0139285 | A1 | 6/2011 | Lundberg et al. | |
| 2012/0144945 | A1 * | 6/2012 | Bai et al. | 74/473.11 |
| 2012/0152688 | A1 * | 6/2012 | Lee et al. | 192/85.63 |
| 2013/0042927 | A1 * | 2/2013 | Neelakantan et al. | 137/334 |
| 2013/0139906 | A1 * | 6/2013 | Neelakantan et al. | 137/334 |
| 2013/0233396 | A1 * | 9/2013 | Lee et al. | 251/62 |
| 2013/0281253 | A1 * | 10/2013 | Ross et al. | 475/275 |

OTHER PUBLICATIONS

Pending U.S. Appl. No. 13/857,429, filed Apr. 5, 2013, by Ross et al. All pages.
Pending U.S. Appl. No. 13/867,495, filed Apr. 22, 2013, by Ross et al. All pages.
Pending U.S. Appl. No. 13/890,869, filed May 9, 2013, by Otanez et al. All pages.

* cited by examiner

*Primary Examiner* — Derek D Knight

(57) ABSTRACT

An assembly includes a valve body having an inlet in selective communication with an outlet and having an unlatch port, a latching piston disposed within the valve body, a balance spring disposed between the latching piston and the valve body, and a valve piston disposed within the valve body. The inlet communicates with the outlet when the valve piston is in a first position and the inlet does not communicate with the outlet when the valve piston is in a second position. A diaphragm spring is disposed between the latching piston and the valve piston. A holding spring is disposed between the valve piston and the valve body. An unlatching mechanism is in communication with the unlatch port of the valve body.

20 Claims, 8 Drawing Sheets

LATCHING CLUTCH VALVE CONTROL SYSTEM

CROSS-REFERENCE TO RELATED APPLICATIONS

This application claims the benefit of U.S. Provisional Application No. 61/663,804 filed Jun. 25, 2012. The disclosure of the above application is incorporated herein by reference.

FIELD

The present invention relates to a latching clutch valve control system for use in an automatic transmission having torque-transmitting mechanisms that are selectively engageable to achieve multiple gear ratios. More particularly, the present invention relates to a latching clutch valve that is coupled to more than one torque-transmitting mechanism having multiple unlatching states.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

In order to increase the fuel economy of motor vehicles, it may be desirable to stop the engine during certain circumstances, such as when stopped at a red light or idling. The engine is then turned back on when certain conditions are met, such as a throttle being depressed. This automatic engine stop and restart is referred to as engine stop/start. During an engine stop, the hydraulic control system which controls the transmission may lose pressure. After the engine has been shut down and has remained off for an extended period of time, the hydraulic fluid within the transmission the fluid may drain down from the passages of the hydraulic control system into a transmission sump under the force of gravity. Upon engine restart, the transmission may take an appreciable amount of time to establish pressure before full transmission operation may resume.

In some powertrain systems it is generally desirable to have quick shift timing and system recovery. As such, it may be desirable to maintain pressure in a clutch, even when line pressure within the hydraulic control system and/or clutch feed pressure is zero or near zero. In other situations, however, it may be desirable to eliminate clutch feed pressure to a particular clutch, such as when putting a vehicle in reverse. Accordingly, there is a need for a clutch pressure control system that allows for timely shifting and recovery, even if the engine or motor is shut off, but that also allows a vehicle to move in reverse or to otherwise deactivate a clutch or multiple clutches.

SUMMARY

The present disclosure provides a latching system to retain clutch pressure for one or more torque transmitting mechanisms in an automatic transmission, and to release clutch pressure when desired.

In one example, a latching clutch valve is provided for latching and draining a torque transmitting mechanism. The latching clutch valve includes a bypass or latch valve and a valve piston. The latching clutch valve is coupled to at least one other torque-transmitting mechanism to unlatch the latching clutch valve.

In one embodiment an assembly includes a valve body having an inlet in selective communication with an outlet and having an unlatch port, a latching piston disposed within the valve body, a balance spring disposed between the latching piston and the valve body, a valve piston disposed within the valve body, wherein the inlet communicates with the outlet when the valve piston is in a first position and wherein the inlet does not communicate with the outlet when the valve piston is in a second position, a diaphragm spring disposed between the latching piston and the valve piston, a holding spring disposed between the valve piston and the valve body, and an unlatching valve assembly in communication with the unlatch port of the valve body.

In another embodiment the unlatching valve assembly includes a feed path in communication with the unlatch port, a first fluid path in communication with a first clutch and the feed path, a second fluid path in communication with a second clutch and the feed path, and the first fluid path is disposed in parallel relationship with the second fluid path.

In yet another embodiment a first one-way valve is disposed within the first fluid path for allowing fluid communication from the first clutch to the feed path and a second one-way valve is disposed within the second fluid path for allowing fluid communication from the second clutch to the feed path.

In yet another embodiment the unlatch valve assembly includes a first port, a second port, a third port, a fourth port, and a spool valve moveable between a first position and a second position, wherein the first port communicates with a first end surface of the spool valve and a first clutch, the second port communicates with a second end surface of the spool valve and a second clutch, the third port is in fluid communication with a source of pressurized hydraulic fluid, and the fourth port is in communication with the unlatch port, and wherein the spool valve allows fluid communication between the third port and the fourth port when the spool valve is in the first position and wherein the spool valve prevents fluid communication between the third port and the fourth port when the spool valve is in the second position.

In yet another embodiment the unlatch valve assembly further includes a biasing member in contact with a third surface of the spool valve, wherein the first and second end surfaces are opposite the third surface.

In yet another embodiment the unlatch port is hydraulically isolated from the inlet and the outlet.

In yet another embodiment the latch piston includes a first side opposite a second side, wherein the inlet communicates with the first side and the unlatch port communicates with the second side.

In yet another embodiment the unlatch valve assembly selectively communicates pressurized hydraulic fluid to the unlatch port to move the latch piston to an unlatch position.

In yet another embodiment an inner housing is disposed within the valve body, and the latching piston is disposed within the inner housing, and the inner housing defines a fluid port that communicates between the inlet and the first side of the latching piston.

In yet another embodiment the valve piston is sealingly engaged to the valve body and the valve piston includes a stem that is disposed through an opening in the inner housing.

In yet another embodiment the diaphragm spring contacts the second side of the latching piston and the stem of the valve piston.

In yet another embodiment the balance spring contacts the second side of the latching piston and the inner housing.

In yet another embodiment the valve body defines a fluid passage that communicates from the inlet to the outlet.

In yet another embodiment a flow restriction orifice and an exhaust are in communication with the unlatch valve assembly and the unlatch port.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
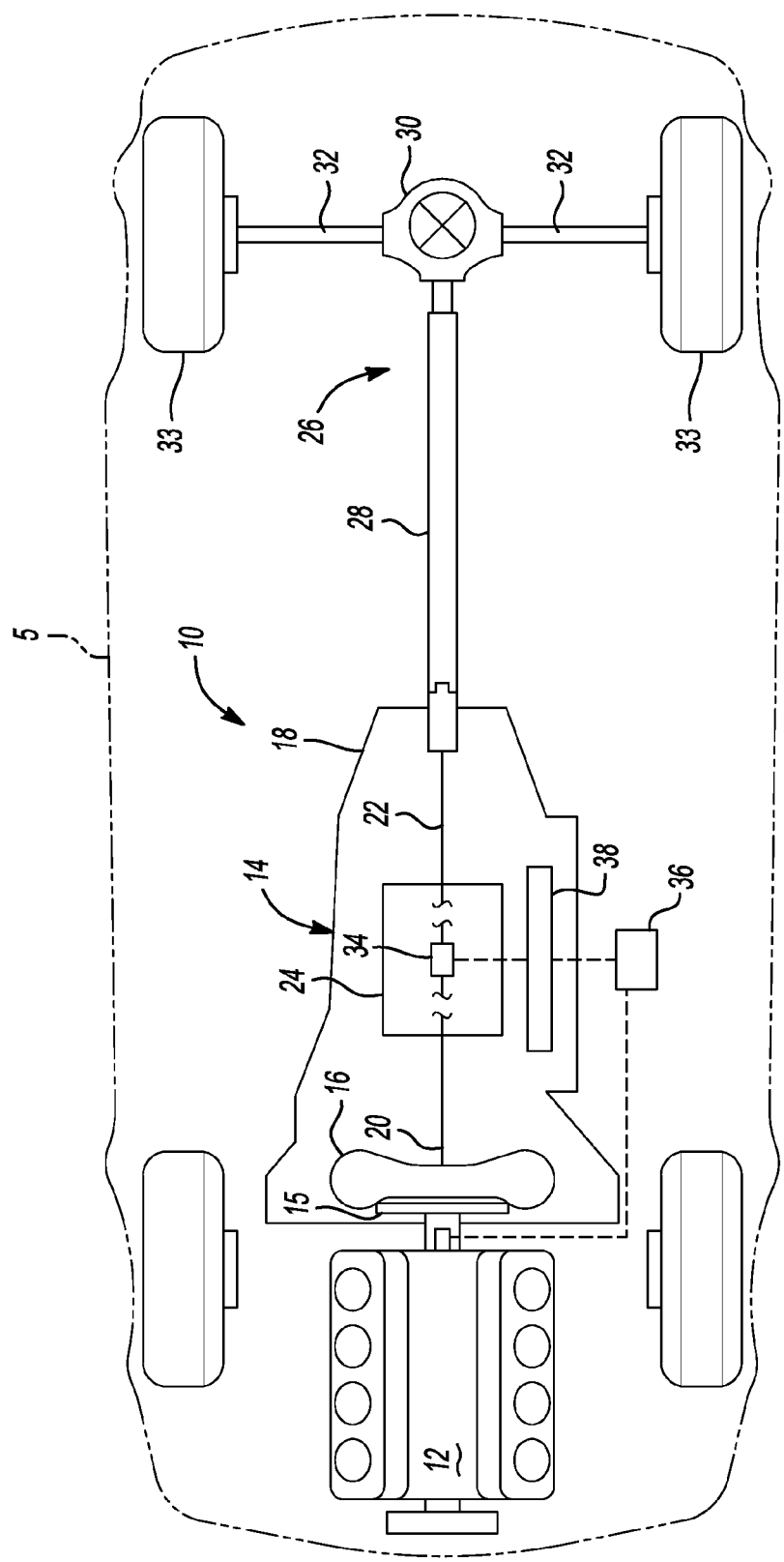
FIG. 1 is a schematic diagram of an exemplary powertrain in a motor vehicle according to the principles of the present invention.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric motor, or any other type of prime mover, without departing from the scope of the present disclosure. The engine 12 supplies a driving torque to the transmission 14 through a flexplate 15 or other connecting device that is connected to a starting device 16. The starting device 16 may be a hydrodynamic device, such as a fluid coupling or torque converter, a wet or dry clutch, or an electric motor. It should be appreciated that any starting device between the engine 12 and the transmission 14 may be employed or that the starting device 16 may be removed.

The transmission 14 generally includes a typically cast, metal housing 18 which encloses and protects the various components of the transmission 14. The housing 18 includes a variety of apertures, passageways, shoulders and flanges which position and support these components. A transmission input shaft 20 and a transmission output shaft 22 are supported by the transmission housing 18. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control system 36. The control system 36 may include a transmission control module, an engine control module, or a hybrid control module, or any other type of controller. The control system 36 may include one or more electronic control devices having a pre-programmed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid to the clutches/brakes 34 that engages the clutches/brakes 34.

Figure 2:
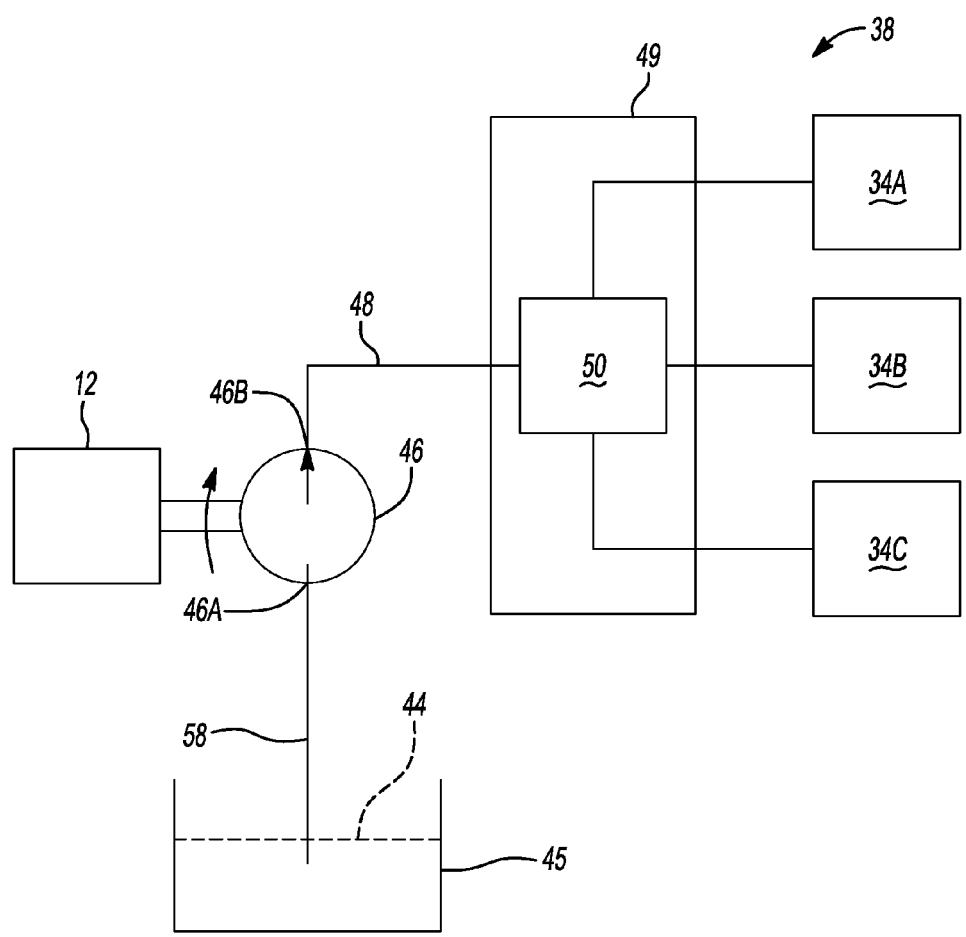
FIG. 2 is a schematic diagram of a portion of an exemplary hydraulic control system in accordance with the principles of the present invention.

Turning to FIG. 2, a portion of the hydraulic control system 38 is illustrated. At the outset it should be appreciated that the portion of the hydraulic control system 38 shown in FIG. 2 is exemplary and that other configurations may be employed. Generally speaking, the hydraulic control system 38 is operable to provide lubrication and cooling to various components of the transmission 14 and to selectively engage the clutches/brakes 34 by communicating a hydraulic fluid 44, such as automatic transmission fluid, from a sump 45 to various circuits or subsystems of the transmission 14. The sump 45 is a tank or reservoir to which the hydraulic fluid 44 returns and collects from various components and regions of the automatic transmission 14. The hydraulic fluid 44 is forced from the sump 45 and communicated throughout the hydraulic control system 38 via a pump 46. The pump 46 may be, for example, a gear pump, a vane pump, a gerotor pump, or any other positive displacement pump. The pump 46 may be driven by the engine 12 or by an electric motor or other prime mover without departing from the scope of the present invention. The pump 46 includes an inlet port 46A and an outlet port 46B. The inlet port 46A communicates with the sump 45 via a suction line 47. The outlet port 46B communicates pressurized hydraulic fluid 44 to a main line pressure circuit 48. The main line pressure circuit 48 may include various optional features including, for example, a spring biased blow-off safety valve, a pressure side filter, or a spring biased check valve.

The main line pressure circuit 48 communicates with a clutch actuation circuit 49 and the various other subsystems and circuits (not shown) of the hydraulic control system 38. For example, the hydraulic control system 38 may include cooling circuits, lubrication circuits, starting device control circuits, to name but a few. The clutch actuation circuit 49 includes clutch control solenoids, valves, and actuators operable to engage the plurality of clutches/brakes 34. The clutch actuation circuit 49 further includes a latching clutch control valve or system 50 according to the principles of the present invention. The latching clutch control valve 50 is in communication with a first torque-transmitting mechanism 34A, a second torque-transmitting mechanism 34B, and a third torque-transmitting mechanism 34C.

Figure 3:
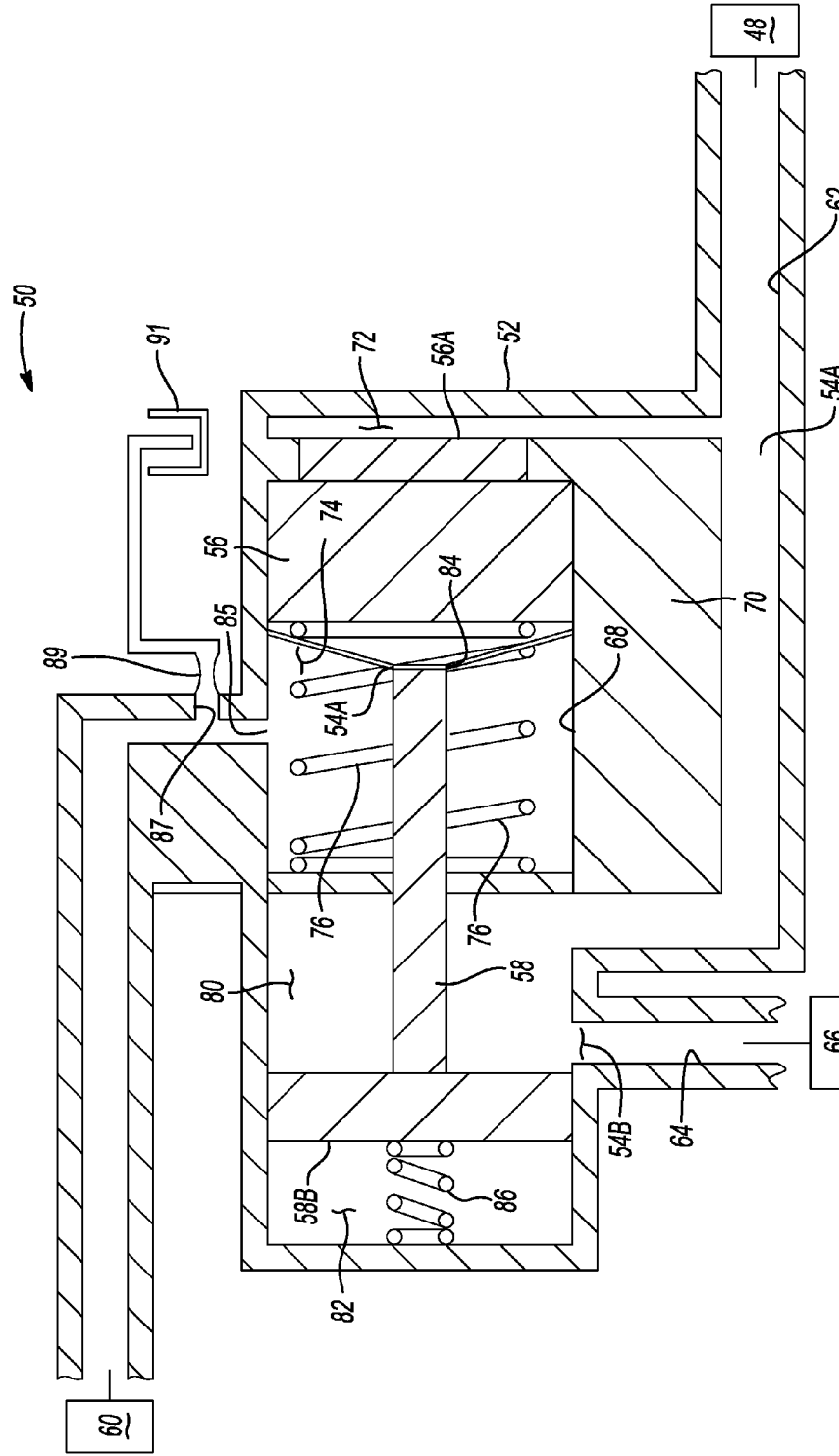
FIG. 3 is a schematic diagram of an exemplary latching clutch valve in a first state according to the principles of the present invention.

With reference to FIG. 3, the latching clutch control valve 50 used as a part of the clutch actuation circuit 48 is illustrated as a schematic diagram. The latching clutch control valve 50 includes a valve body 52. The valve body 52 includes an axial passage 54 that houses a latching piston 56, a valve piston 58, and an unlatching valve assembly 60. The valve body 52 further includes a first port 54A that communicates with the passage 54 and a second port 54B that communicates with the passage 54. The first port 54A is in communication with a feed line 62. The feed line 62 is in fluid communication with the main supply line 48 or any other feed line. The second port 54B is in communication with a clutch supply line 64. The clutch supply line 64 is in communication with an actuator 66 of one of the plurality of torque transmitting mechanisms 34.

The latching piston 56 is slidably disposed within the passage 54 and includes a first end surface 56A and a second end surface 56B opposite the first end surface 56A. In the example provided the latching piston 56 is disposed within an inner bore 68 defined by an inner cylindrical housing 70 that is substantially coaxial with the passage 54. The first end surface 56A of the latching piston 56 cooperates with the passage 54 and the inner housing 70 to define a first fluid chamber 72. The second end surface 56B of the latching piston 56 cooperates with the inner housing 70 to define a second fluid chamber 74. At least one biasing member or balance spring 76 is disposed between the second end 56B of the latching piston 56 and the inner housing 70. The balance spring 76 biases the latching piston 56 axially towards the first fluid chamber 72.

The valve piston 58 is slidably disposed within the passage 54 and includes a first end surface 58A and a second end surface 58B. In the example provided a portion of the valve piston 58 extends through the inner housing 70 such that the first end surface 58A is disposed within the second fluid chamber 74. The valve piston 58 divides the passage 54 into a third fluid chamber 80 and a fourth fluid chamber 82. A biasing member or latching spring 84 is connected between the second end 56B of the latching piston 56 and the first end 58A of the valve piston 58. In the example provided the latching spring 84 is preferably a diaphragm spring, though it should be appreciated that other types of biasing members may be employed without departing from the scope of the present invention. A biasing member or holding spring 86 is connected between the second end 58B of the valve piston 58 and the passage 54 of the valve body 52.

The unlatching assembly 60 is configured to unlatch the latching piston 56 under certain operating conditions by providing an unlatching fluid to the fluid chamber 74. Therefore, the unlatching assembly 60 communicates with the second fluid chamber 74 via a fluid port 85.

The first and third fluid chambers 72 and 80 are in fluid communication with each other and with the first port 54A. The second fluid chamber 74 is hydraulically isolated or sealed from the first and third fluid chambers 72 and 80. The fourth fluid chamber 82 is hydraulically isolated or sealed from the fluid chambers 72, 74, and 80. An exhaust port 87 is located within the second fluid chamber 74. The exhaust port 87 includes a restricted flow orifice 89 that allows the second fluid chamber 74 to leak or exhaust to a sump 91.

During normal operating conditions, the main supply line 48 (or any other feed line) provides hydraulic fluid to the first port 54A of latching valve 50. The hydraulic fluid provided during normal operating conditions is pressurized at a level below a first threshold. An example of a first threshold value for use with the present invention is approximately 21 bar. In this condition, the balance spring 76 is sufficient to bias the latching piston 56 to seat within the inner bore 68 (i.e. the latching piston 56 is disposed to the right with respect to FIG. 3). The latching spring 84 therefore is in compression and holds the valve piston 58 against the bias of the holding spring 86 (i.e. holds the valve piston 58 to the left with respect to FIG. 3). With the valve piston 58 held to the left or stroked, the first port 54A communicates with the second port 54B and hydraulic fluid at normal operating pressure conditions freely flows through the latching valve 50 to the clutch actuator 66.

Figure 4:
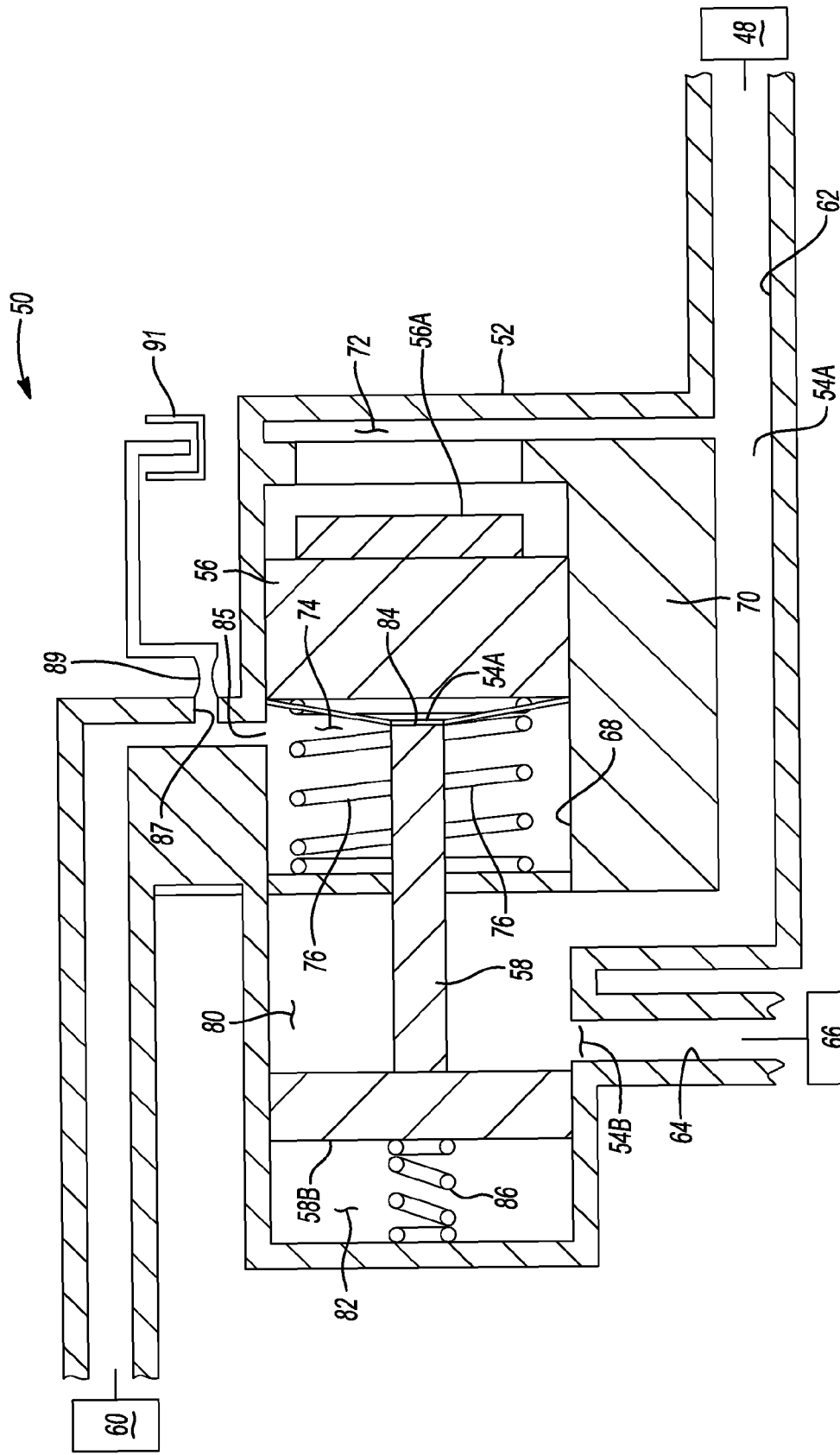
FIG. 4 is a schematic diagram of an exemplary latching clutch valve in a second state according to the principles of the present invention.

Turning to FIG. 4, during an over-pressurization condition the main supply line 48 provides hydraulic fluid to the first port 54A of latching valve 50 at a pressure level greater than the threshold. In this condition, the balance spring 76 is no longer sufficient to bias the latching piston 56 to seat within the inner bore 68 and the latching piston 56 strokes to unseat from the inner bore 68 (i.e. moves to the left). This movement places the latching spring 84 into a neutral condition that does not exert a force on the valve piston 58.

Figure 5:
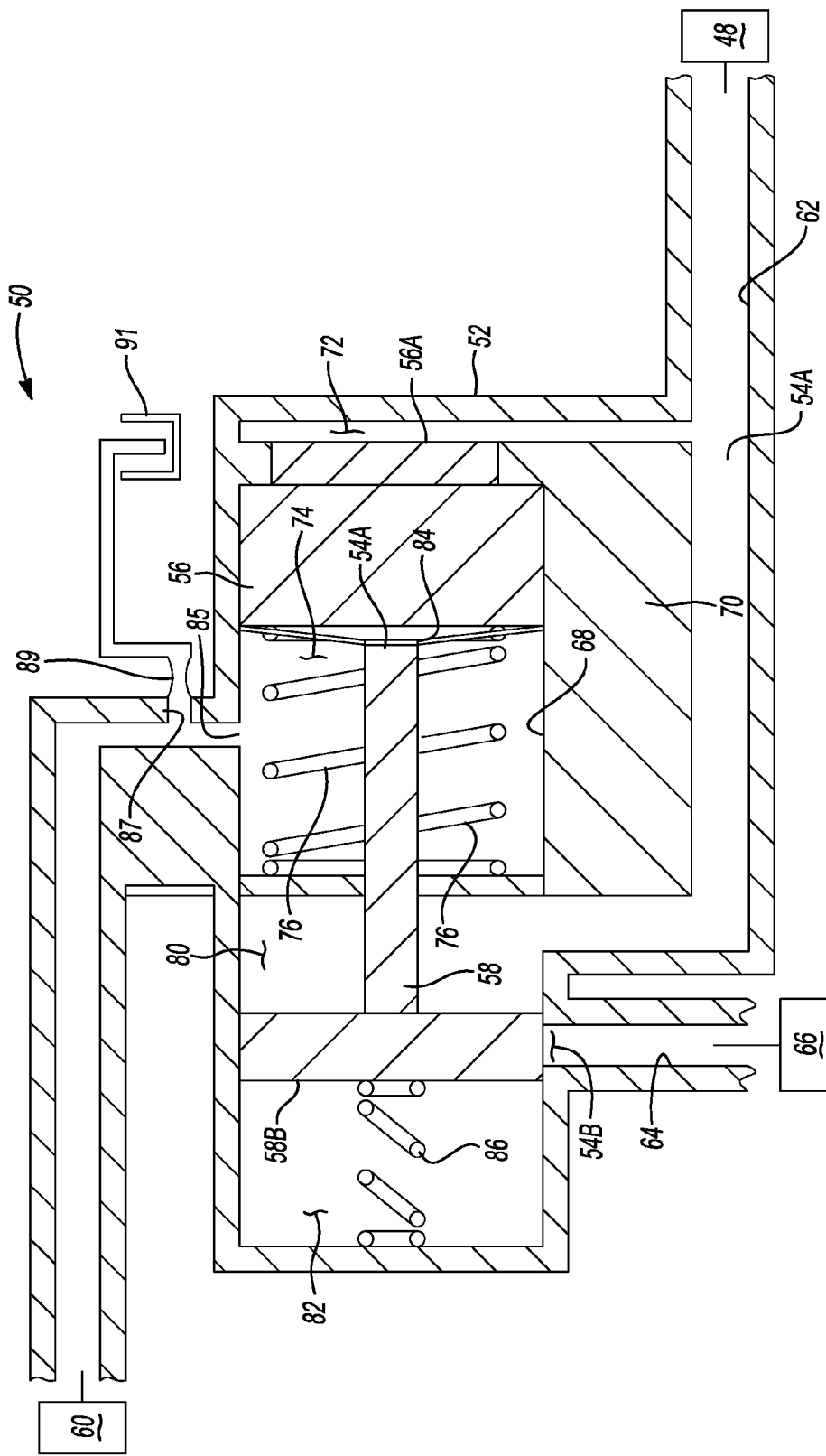
FIG. 5 is a schematic diagram of an exemplary latching clutch valve in a third state according to the principles of the present invention.

When the motor vehicle 5 stops (i.e., at a red light for example), it may be desirable to shut off the engine 12 in order to improve fuel economy. However, shutting off the engine 12 in turn ceases operation of the pump 12 and therefore causes a loss of hydraulic fluid pressure in the transmission hydraulic circuit and clutches. In order to properly control the transmission 14 upon engine re-start and vehicle launch, it is desirable to trap hydraulic fluid within the clutch actuator 66. Therefore, release of pressure allows the latching piston 56 to de-stroke (moves to the right) and reseat within the inner bore 68, shown in FIG. 5, while allowing the valve piston 58 to de-stroked (moves to the right). This keeps a charge of pressurized hydraulic fluid within the clutch actuator 66 even as the pump 46 is turned off during the engine stop-start event or other operating condition.

When the engine 12 is restarted and the pump 46 supplies normal pressure levels, the hydraulic fluid acts on the valve piston 58 within the third fluid chamber 80 and forces the valve piston 58 against the holding spring 86. As the valve piston 58 strokes to the left, the second port 54B is opened and the latching spring 84 is reset and exerts a biasing force against the valve piston 58, keeping the valve piston 58 stroked until another latching condition occurs. Due to the charge of pressurized hydraulic fluid within the clutch actuator 66, the associated torque transmitting mechanism 34 may be quickly engaged.

Figure 6:
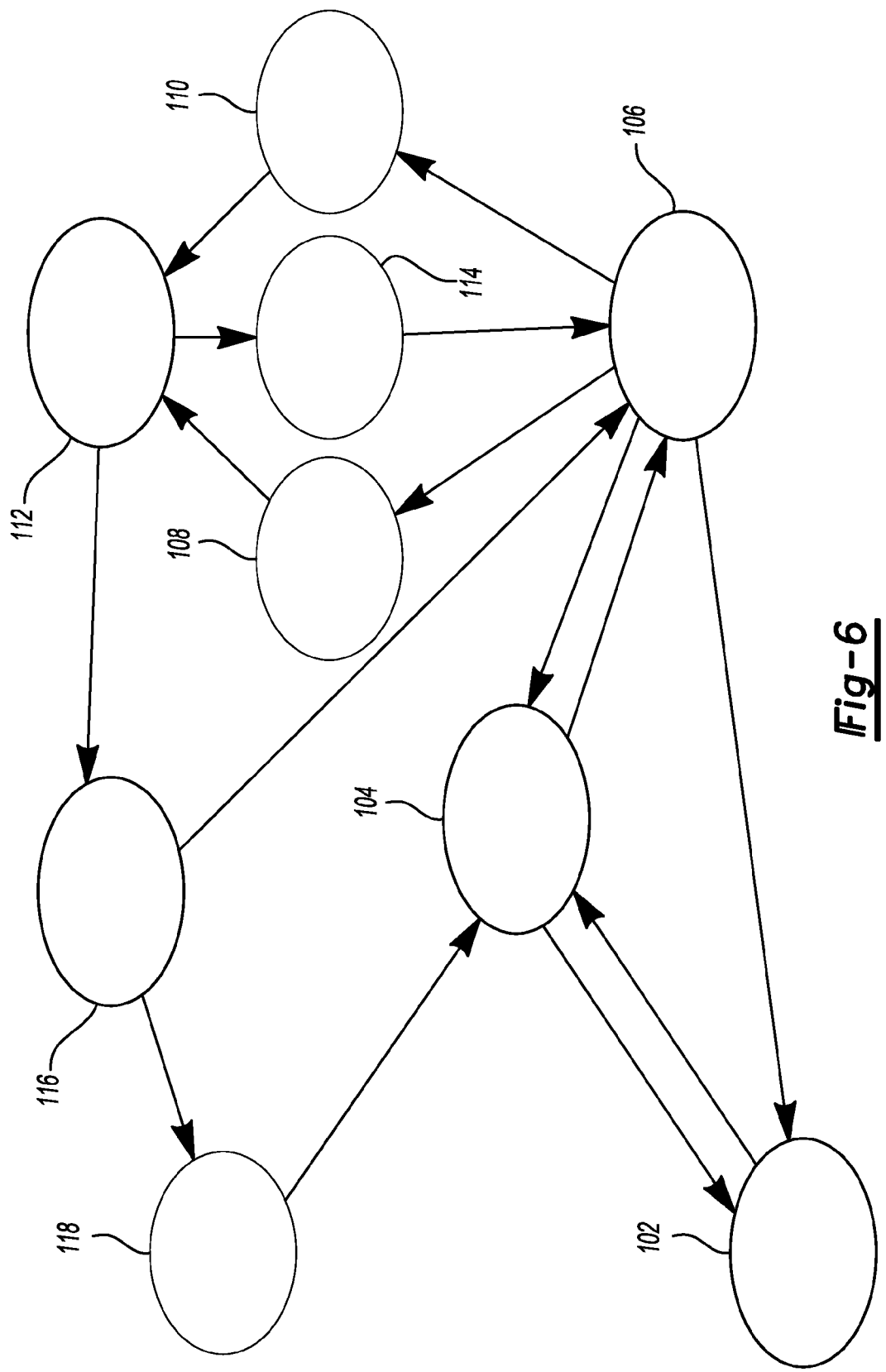
FIG. 6 is a graph illustrating the discrete states of the latching clutch valve described in FIGS. 3-5.

FIG. 6 is a graph illustrating the different operating conditions of the latch valve 50, including the states shown in FIGS. 3-6, as well as unlatching states. In operating mode 102 the feed pressure at port 54A (Pf) is zero and the latch piston 56 is unlatched. In operating mode 104 the transmission is in a normal operating mode and the feed pressure (Pf) at port 54A is less than a pressure (P2) required to latch the valve 50 and the unlatch oil pressure at the unlatch port 85 is low. In operating mode 106 the unlatch oil pressure is high. In operating modes 108 and 110 the latching piston 56 is latching. In operating mode 112 the system is latched, P2 is less than Pf which is less than a pressure (P3) required to unlatch the valve 50, and the unlatch oil is low. In operating mode 114 the latching piston 56 is unlatching. In operating mode 116 P1 is greater than Pf. In operating mode 118 P1 is less than Pf and the latching piston 56 is unlatching.

Figure 7:
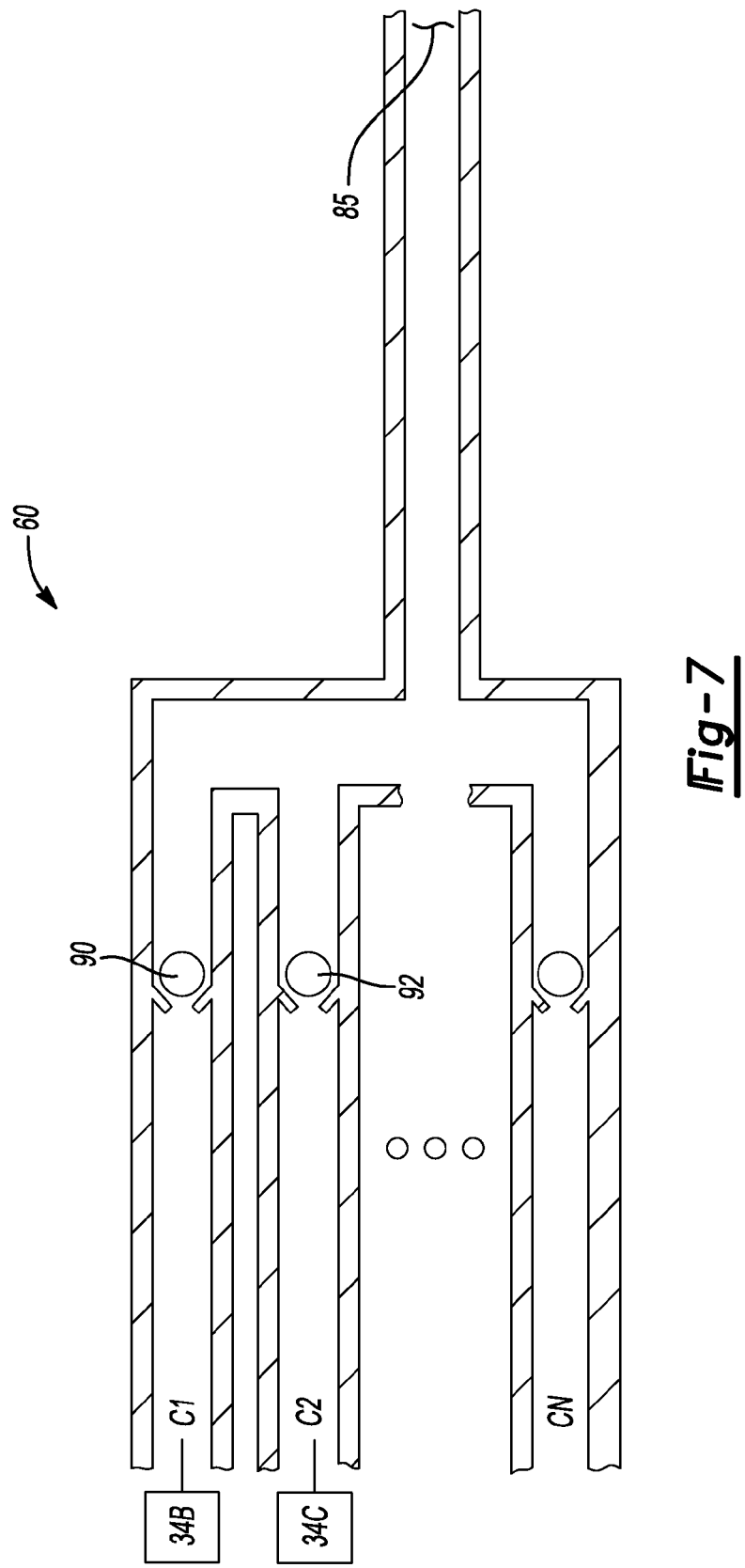
FIG. 7 is a schematic diagram of an unlatching valve mechanism according to the principles of the present invention.

With reference to FIG. 7, a first embodiment of the unlatching valve assembly 60 is shown. The unlatching valve assembly 60 includes a first one-way valve 90 and a second one way valve 92. The first one-way valve 90 is in fluid communication with the fluid port 85 and with the second torque-transmitting mechanism 34B. The first one-way valve 90 allows for fluid communication in one direction only. In the example provided, the first one-way valve 90 allows for fluid communication from the second torque-transmitting mechanism 34B to the fluid port 85 and prevents fluid communication from the port 85 to the second torque-transmitting mechanism 34B. Therefore, under certain fluid pressure conditions, as will be described below, the first one-way valve 90 unseats to allow fluid communication between second torque-transmitting mechanism 34B and the second fluid chamber 74 via fluid port 85.

The second one-way valve 92 is in fluid communication with the fluid port 85 and with the third torque-transmitting mechanism 34C. The second one-way valve 92 allows for fluid communication in one direction only. In the example provided, the second one-way valve 92 allows for fluid communication from the third torque-transmitting mechanism 34C to the fluid port 85 and prevents fluid communication from the port 85 to the third torque-transmitting mechanism 34C. Therefore, under certain fluid pressure conditions, as will be described below, the second one-way valve 92 unseats to allow fluid communication between third torque-transmitting mechanism 34C and the second fluid chamber 74 via port 85. It should be appreciated that any number of one-way valves and clutches may be included in parallel relationship such that any one clutch may unlatch the system.

During certain operating conditions it is desirable to unlatch the latching valve 50 without a drop in pressure in the hydraulic control system 38. Accordingly, the first one-way valve 90 and the second one-way valve 92 are each configured to unseat or open when the pressure level of the hydraulic fluid within either the second clutch 34B or the third clutch 34C exceeds a predetermined threshold value, or any other clutch (CN), or any other suitable hydraulic signal. When either of the one-way valves 90 and 92 unseats (or any other connected valve as shown in FIG. 7), the second fluid chamber 74 communicates and equalizes pressure with the hydraulic fluid within the second or third clutches 34B and 34C (or any other clutch or hydraulic circuit). This allows the balance spring 76 to de-stroke the latching piston 56 (moves to the right). Preferably, the second and third clutches 34B and 34C are selected from a group of clutches or brakes that are normally engaged in a default drive condition, such as a first drive gear. It should be appreciated that any clutch signal or any other transmission signal (for example line pressure, a torque converter clutch signal, etc.) may be used to provide an unlatch signal without departing from the scope of the present invention.

Figure 8:
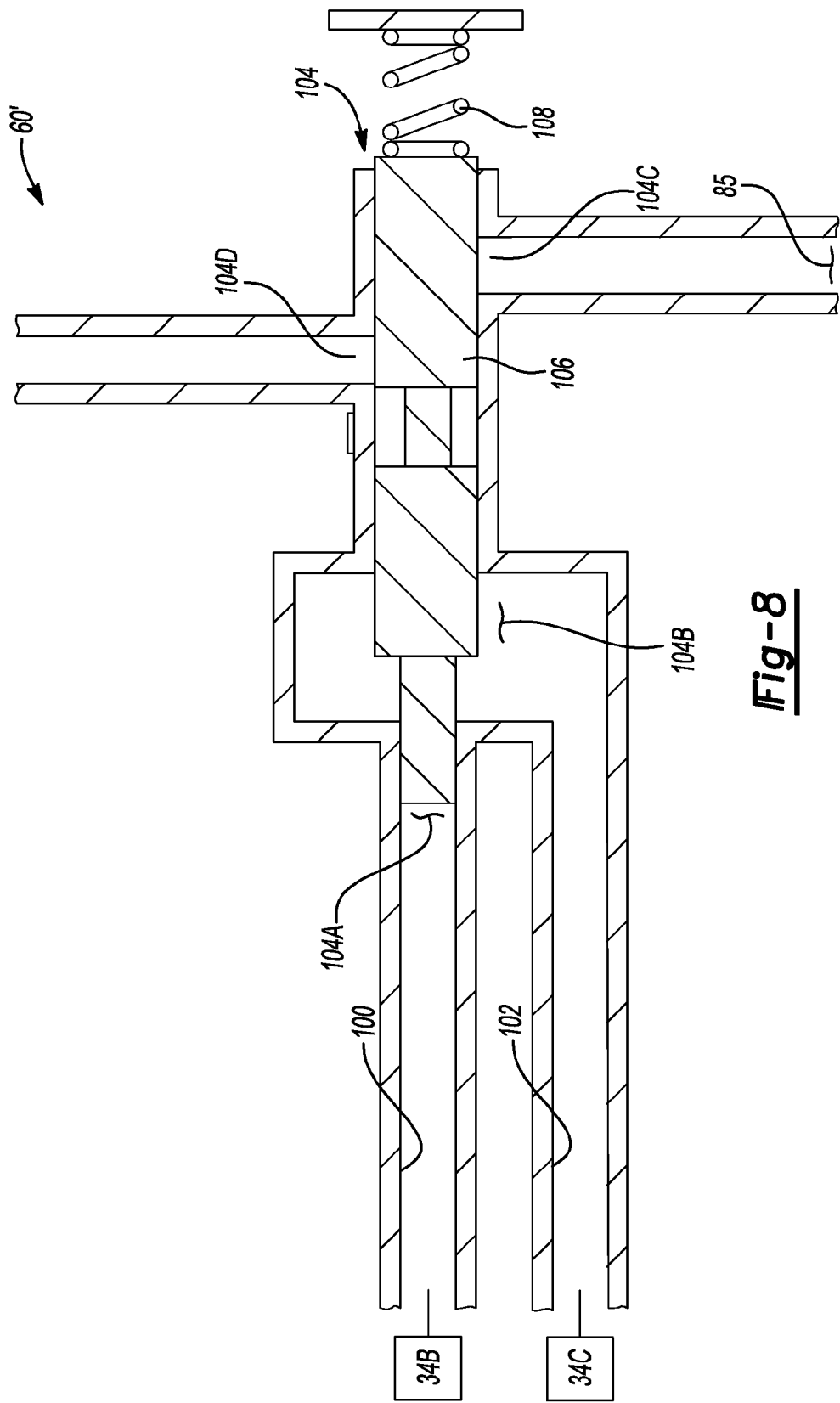
FIG. 8 is a schematic diagram of another unlatching valve mechanism according to the principles of the present invention.

Turning now to FIG. 8, another example of an unlatching valve assembly for use with the latching valve 50 is indicated by reference number 60'. The unlatching valve assembly 60' includes a fluid line 100 in fluid communication with the second torque-transmitting mechanism 34B and a fluid line 102 in fluid communication with the third torque-transmitting mechanism 34C. Each of the fluid lines 100 and 102 communicate with a valve sub-assembly 104 that includes a fluid port 104A, a fluid port 104B, and a fluid port 104C, and a fluid port 140D. Fluid port 104A is in fluid communication with fluid line 100. Fluid port 104B is in fluid communication with fluid line 102. Fluid port 104C is in fluid communication with the second fluid chamber 74 via port 85. Fluid port 104D is in fluid communication with any other feed oil line, such as line pressure. A valve 106 is slidably disposed within the valve sub-assembly 104. The valve 106 is configured to move between a stroked position and an un-stroked position. A biasing member 108, such as a spring, is disposed between the valve 106 and the valve sub-assembly 104. The biasing member 108 is configured to bias the valve 106 to the de-stroked position.

In the de-stroked position, the valve 106 is configured to substantially seal off the fluid port 104D from the fluid port 104C. In this condition, therefore, no latch oil is provided to the fluid chamber 74. In the stroked position, the fluid port 104D is in fluid communication with the fluid port 104C thereby providing unlatch oil to the fluid chamber 74. During certain operating conditions it is desirable to unlatch the latching valve 50 without a drop in pressure in the hydraulic control system 38. Accordingly, the valve 106 is configured to unseat or stroke when the pressure level of the hydraulic fluid within both the second torque-transmitting mechanism 34B and the third torque transmitting mechanism 34C exceeds a predetermined threshold value sufficient to overcome the bias of the biasing member 108. When the valve 106 unseats or strokes, the second fluid chamber 74 communicates and equalizes pressure with the hydraulic fluid within the second or third clutches 34B and 34C. This allows the balance spring 76 to de-stroke the latching piston 56 (moves right). Preferably, the second and third clutches 34B and 34C are selected from a group of clutches or brakes that are normally engaged in a default drive condition. It should be appreciated that while only two hydraulic signals are illustrated as opening the valve 106, any number of hydraulic signals may be used to open the valve without departing from the scope of the present invention. Finally, it should be appreciated that the unlatching valve assemblies illustrated in both FIGS. 7 and 8 may be combined to determine when to provide an unlatch signal to the latching piston 56.

The components of the hydraulic control system 38 and latch valve 50 are connected via a plurality of fluid communication lines. It should be appreciated that the fluid communication lines described above may be integrated in a valve body or formed from separate tubing or piping without departing from the scope of the present disclosure. In addition, the fluid communication lines may have any cross sectional shape and may include additional or fewer bends, turns, and branches than illustrated without departing from the scope of the present disclosure.

The description of the invention is merely exemplary in nature and variations that do not depart from the gist of the invention are intended to be within the scope of the invention. Such variations are not to be regarded as a departure from the spirit and scope of the invention.

The following is claimed:

1. An assembly in a transmission, the assembly comprising:
   a valve body having an inlet in selective communication with an outlet and having an unlatch port;
   a latching piston disposed within the valve body;
   a balance spring disposed between the latching piston and the valve body;
   a valve piston disposed within the valve body, wherein the inlet communicates with the outlet when the valve piston is in a first position and wherein the inlet does not communicate with the outlet when the valve piston is in a second position;
   a diaphragm spring disposed between the latching piston and the valve piston;
   a holding spring disposed between the valve piston and the valve body; and
   an unlatching mechanism in communication with the unlatch port of the valve body.

2. The assembly of claim 1 wherein the unlatching mechanism includes a feed path in communication with the unlatch port, a first fluid path in communication with a first clutch and the feed path, a second fluid path in communication with a second clutch and the feed path, and wherein the first fluid path is disposed in parallel relationship with the second fluid path.

3. The assembly of claim 2 wherein the unlatching mechanism further includes a first one-way valve disposed within the first fluid path for allowing fluid communication from the first clutch to the feed path and a second one-way valve disposed within the second fluid path for allowing fluid communication from the second clutch to the feed path.

4. The assembly of claim 1 wherein the unlatching mechanism includes a first port, a second port, a third port, a fourth port, and a spool valve moveable between a first position and a second position, wherein the first port communicates with a first end surface of the spool valve and a first clutch, the second port communicates with a second end surface of the spool valve and a second clutch, the third port is in fluid communication with a source of pressurized hydraulic fluid, and the fourth port is in communication with the unlatch port, and wherein the spool valve allows fluid communication between the third port and the fourth port when the spool valve is in the first position and wherein the spool valve prevents fluid communication between the third port and the fourth port when the spool valve is in the second position.

5. The assembly of claim 4 wherein the unlatching mechanism further includes a biasing member in contact with a third surface of the spool valve, wherein the first and second end surfaces are opposite the third surface.

6. The assembly of claim 1 wherein the unlatch port is hydraulically isolated from the inlet and the outlet.

7. The assembly of claim 6 wherein the latch piston includes a first side opposite a second side, wherein the inlet communicates with the first side and the unlatch port communicates with the second side.

8. The assembly of claim 7 wherein the unlatching mechanism selectively communicates pressurized hydraulic fluid to the unlatch port to move the latch piston to an unlatched position.

9. The assembly of claim 8 further comprising an inner housing disposed within the valve body, and wherein the latching piston is disposed within the inner housing, and wherein the inner housing defines a fluid port that communicates between the inlet and the first side of the latching piston.

10. The assembly of claim 9 wherein the valve piston is sealingly engaged to the valve body and the valve piston includes a stem that is disposed through an opening in the inner housing.

11. The assembly of claim 10 wherein the diaphragm spring contacts the second side of the latching piston and the stem of the valve piston.

12. The assembly of claim 11 wherein the balance spring contacts the second side of the latching piston and the inner housing.

13. The assembly of claim 12 wherein the valve body defines a fluid passage that communicates from the inlet to the outlet.

14. The assembly of claim 1 further comprising a flow restriction orifice and an exhaust in communication with the unlatching mechanism and the unlatch port.

15. A system for a transmission in a motor vehicle, the system comprising:
   a pressure regulator subsystem that provides hydraulic fluid at variable pressures;
   a first clutch actuator;
   a second clutch actuator;
   a third clutch actuator;
   a valve assembly including:
      a valve body having an inlet in selective communication with an outlet and having an unlatch port, wherein the inlet is in communication with the pressure regulator subsystem and the outlet is in communication with the third clutch actuator;
      a latching piston disposed within the valve body and moveable between a first position and a second position;
      a balance spring disposed between the latching piston and the valve body;
      a valve piston disposed within the valve body, wherein the inlet communicates with the outlet when the valve piston is in a first position and wherein the inlet does not communicate with the outlet when the valve piston is in a second position;
      a diaphragm spring disposed between the latching piston and the valve piston wherein the diaphragm spring has a normal state that exerts force between the latching piston and the valve piston and an inverted state that does not exert a substantial force on the latching piston and the valve piston;
      a holding spring disposed between the valve piston and the valve body;
      an unlatching mechanism in communication with the first clutch actuator, the second clutch actuator, and the unlatch port,
   wherein when a pressure of the hydraulic fluid is less than a first threshold the diaphragm spring is in a normal state and moves the valve piston to the first position against the bias of the holding spring,
   wherein when a pressure of the hydraulic fluid is greater than the first threshold the latching piston moves to the second position and inverts the diaphragm spring;

wherein when a pressure of the hydraulic fluid is less than the first threshold and the diaphragm spring is inverted the holding spring moves the valve piston to the second position, and wherein when a pressure of the hydraulic fluid is greater than a second threshold after the diaphragm spring is inverted and the valve piston is moved to the second position the diaphragm spring is returned to the normal state.

16. The system of claim 15 wherein the unlatching mechanism comprises a feed path in communication with the unlatch port, a first fluid path in communication with the first clutch actuator and the feed path, a second fluid path in communication with the second clutch actuator and the feed path, and wherein the first fluid path is disposed in parallel relationship with the second fluid path.

17. The system of claim 16 further comprising a first one-way valve disposed within the first fluid path for allowing fluid communication from the first clutch actuator to the feed path and a second one-way valve disposed within the second fluid path for allowing fluid communication from the second clutch actuator to the feed path.

18. The system of claim 15 wherein the unlatching mechanism includes a first port, a second port, a third port, a fourth port, and a spool valve moveable between a first position and a second position, wherein the first port communicates with a first end surface of the spool valve and the first clutch actuator, the second port communicates with a second end surface of the spool valve and the second clutch actuator, the third port is in fluid communication with the pressure regulator subsystem, and the fourth port is in communication with the unlatch port, and wherein the spool valve allows fluid communication between the third port and the fourth port when the spool valve is in the first position and wherein the spool valve prevents fluid communication between the third port and the fourth port when the spool valve is in the second position.

19. The system of claim 18 wherein the unlatching mechanism further includes a biasing member in contact with a third surface of the spool valve, wherein the first and second end surfaces are opposite the third surface.

20. The system of claim 15 wherein the third clutch actuator is engaged in a first forward gear.

* * * * *